US009512764B2

(12) United States Patent
Upadhyay et al.

(10) Patent No.: US 9,512,764 B2
(45) Date of Patent: Dec. 6, 2016

(54) AMMONIA STORAGE MANAGEMENT FOR SCR CATALYST

(71) Applicant: Ford Global Technologies, LLC, Dearborn, MI (US)

(72) Inventors: Devesh Upadhyay, Canton, MI (US); Michiel J. Van Nieuwstadt, Ann Arbor, MI (US); Christine Kay Lambert, Dearborn, MI (US); David Wynn Philion, Richmond, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 13/940,150

(22) Filed: Jul. 11, 2013

(65) Prior Publication Data

US 2015/0013309 A1    Jan. 15, 2015

(51) Int. Cl.
*F01N 3/20* (2006.01)

(52) U.S. Cl.
CPC ....... *F01N 3/208* (2013.01); *F01N 2900/1614* (2013.01); *F01N 2900/1622* (2013.01); *Y02T 10/24* (2013.01)

(58) Field of Classification Search
CPC .. F01N 3/208; F01N 2610/085; F01N 3/0842; F01N 2610/02
See application file for complete search history.

(56) References Cited

U.S. PATENT DOCUMENTS

| 6,993,900 | B2 | 2/2006 | Upadhyay et al. | |
|---|---|---|---|---|
| 7,726,118 | B2 | 6/2010 | Oberski et al. | |
| 2003/0131820 | A1* | 7/2003 | Mckay | F01L 13/0005 123/198 F |
| 2004/0153235 | A1* | 8/2004 | Kataoka | B60K 6/485 701/112 |
| 2010/0086467 | A1 | 4/2010 | Johansen et al. | |
| 2011/0061370 | A1* | 3/2011 | Aoyama et al. | 60/285 |
| 2013/0074474 | A1 | 3/2013 | Gonze et al. | |

FOREIGN PATENT DOCUMENTS

| EP | 2025388 A1 | 2/2009 |
|---|---|---|
| EP | 2578830 A1 | 4/2013 |

* cited by examiner

*Primary Examiner* — Kenneth Bomberg
*Assistant Examiner* — Brandon Lee
(74) *Attorney, Agent, or Firm* — Julia Voutyras; Alleman Hall McCoy Russell & Tuttle LLP (57) ABSTRACT

Various systems and methods are described for managing ammonia storage in an SCR catalyst. In one example approach, a method comprises, in response to a vehicle-off event, injecting ammonia during a final exhaust blowdown until a predetermined value of ammonia is stored in the SCR catalyst; and in response to a subsequent vehicle-on event when an amount of ammonia stored in the SCR catalyst is less than the predetermined value, injecting ammonia until the predetermined value of ammonia is stored in the SCR catalyst.

17 Claims, 3 Drawing Sheets

AMMONIA STORAGE MANAGEMENT FOR SCR CATALYST

BACKGROUND AND SUMMARY

Diesel engines may include a selective catalytic reduction (SCR) catalyst in an emission control system to reduce emissions of nitrogen oxides (NOx) during engine operation. A reductant, such as ammonia in the form of urea or diesel exhaust fluid (DEF), may be injected, e.g., in the engine exhaust upstream of the SCR catalyst, so that ammonia is stored in the SCR catalyst to convert NOx into nitrogen and water.

In some examples, an emission control system may include a diesel particulate filter (DPF) in addition to an SCR catalyst. When a DPF is used, thermal regeneration may be employed to clean the filter by increasing the temperature and burning soot that has collected in the filter. As the temperature of the DPF increases, the temperature of the SCR catalyst may also increase. Ammonia that is used as a reductant in the catalyst may be desorbed from the SCR catalyst when the temperature increases resulting in ammonia slip from the catalyst. The slipped ammonia may exit the tailpipe and enter the atmosphere and/or the ammonia may be oxidized when passing through the DPF to form $NO_x$, thus increasing nitrogen oxide ($NO_x$) emissions.

The inventors herein have recognized that performance of an SCR catalyst may depend on an amount of reductant, e.g., ammonia, stored in the catalyst and that various SCR catalyst conditions may impact its capability in reducing NOx. For example, NOx conversion capability may increase with the amount of ammonia stored in the catalyst, NOx conversion capability may increase with temperature up to some threshold temperature which is typically in the range of operational interest (e.g., approximately 400° C.) and reduce thereafter, and ammonia storage in an SCR catalyst may decrease with temperature.

Thus, the inventors herein have recognized that ammonia storage in SCR catalysts must be carefully managed in order to achieve optimal SCR performance with respect to NOx conversion efficiency. Previous approaches for managing ammonia storage in SCR catalysts use closed loop storage control. Such closed loop approaches may lead to insufficient ammonia storage and reduced NOx conversion efficiencies during certain operating conditions, e.g., following cold starts or thermal events such as DPF filter regeneration events.

For example, vehicle-off (engine off) to vehicle-on (engine on) transitions may cause disturbances in the regulation of ammonia storage in an SCR catalyst for a desired NOx conversion efficiency. For example, during long soak durations (times between vehicle-off, engine-off and a subsequent vehicle-on, engine-on event) with no incoming ammonia, the catalyst temperature may decrease or increase from ambient temperatures and, although an amount of ammonia in the catalyst may have been stored so that the catalyst performs optimally with respect to NOx conversion just prior to the vehicle-off event, ammonia in the catalyst may become under-stored following the vehicle-off event and may therefore perform sub-optimally at a subsequent vehicle-on event. Further, since active ammonia injection may not be possible at cold exhaust gas temperatures following a cold start event (e.g., less than 190° C.), increasing ammonia storage in the SCR catalyst following a cold start event may be delayed so that ammonia storage in the catalyst remains under-stored following the vehicle-on event.

As another example, thermal events, wherein an SCR catalyst experiences active and rapid heating such as during a DPF regeneration event, may lead to substantial depletion of ammonia storage in an SCR catalyst. Thus, following a thermal event, it may be desirable to replenish ammonia storage at rate faster than that provided by closed loop storage control in order to more rapidly regain optimal NOx conversion efficiency following the thermal event.

In order to at least partially address these issues, a method for operating an engine with an SCR catalyst comprises, in response to a vehicle-off event, injecting ammonia during a final exhaust blowdown until a predetermined value of ammonia is stored in the SCR catalyst; and in response to a subsequent vehicle-on event when an amount of ammonia stored in the SCR catalyst is less than the predetermined value, injecting ammonia until the predetermined value of ammonia is stored in the SCR catalyst. Further, in some examples, the method may further comprise, following a thermal event when a temperature of the SCR catalyst is less than an upper temperature threshold, injecting ammonia until a target value of ammonia is stored in the SCR catalyst.

In this way, ammonia storage in an SCR catalyst may be preemptively boosted just after an engine-off, vehicle-off event so as to minimize an anticipated storage deficit at a subsequent vehicle-on event, engine-on event leading to an increased NOx conversion efficiency following the vehicle-on event. Further, ammonia injection for storage in an SCR catalyst may be adjusted to reduce delays in achieving target ammonia storage amounts in the catalyst for optimum NOx conversion efficiency following conditions which deplete ammonia storage in the catalyst, e.g., following cold-starts or thermal events such as DPF regeneration events.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
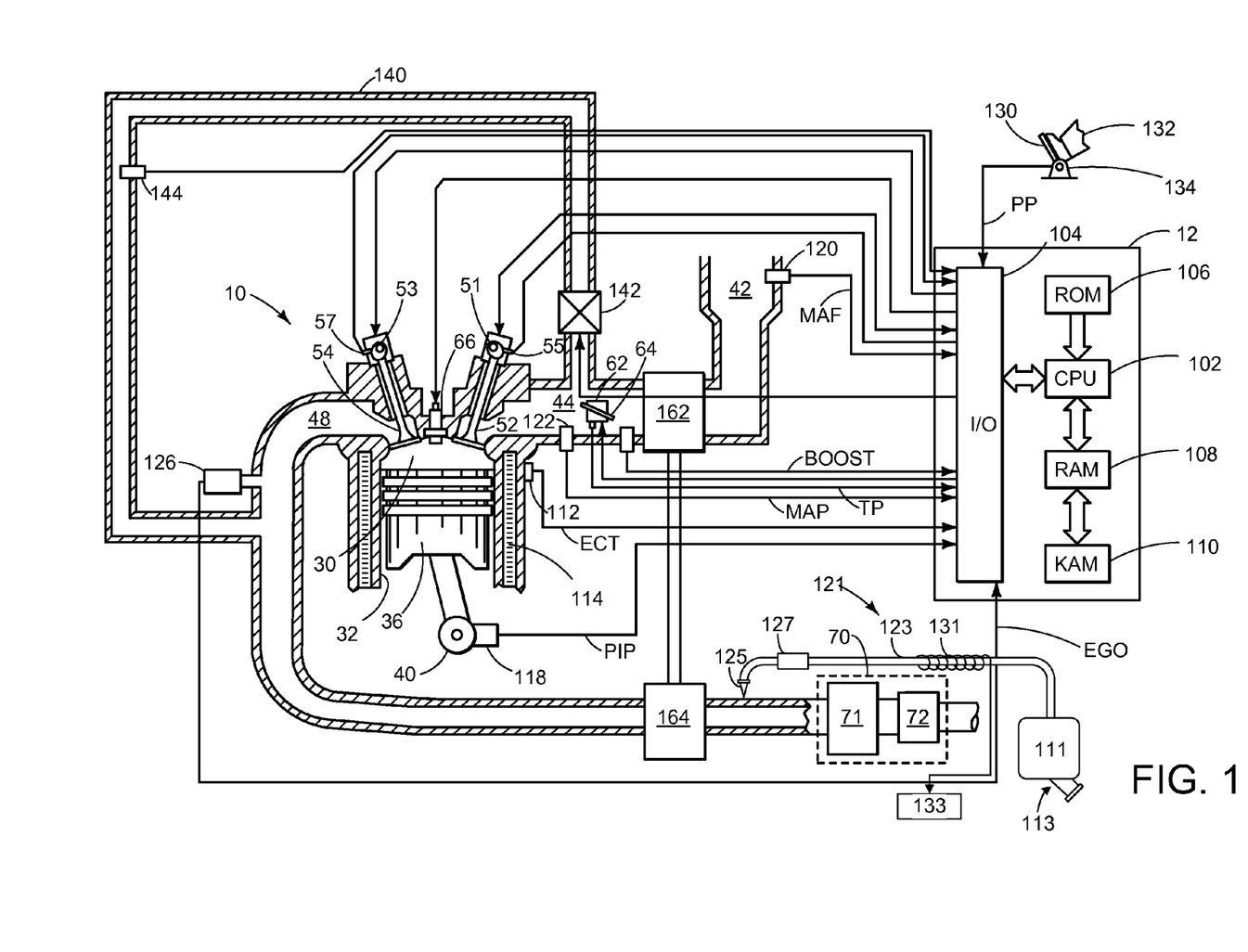
FIG. 1 shows a schematic diagram of an engine with a selective catalytic reduction (SCR) catalyst.
Figure 2:
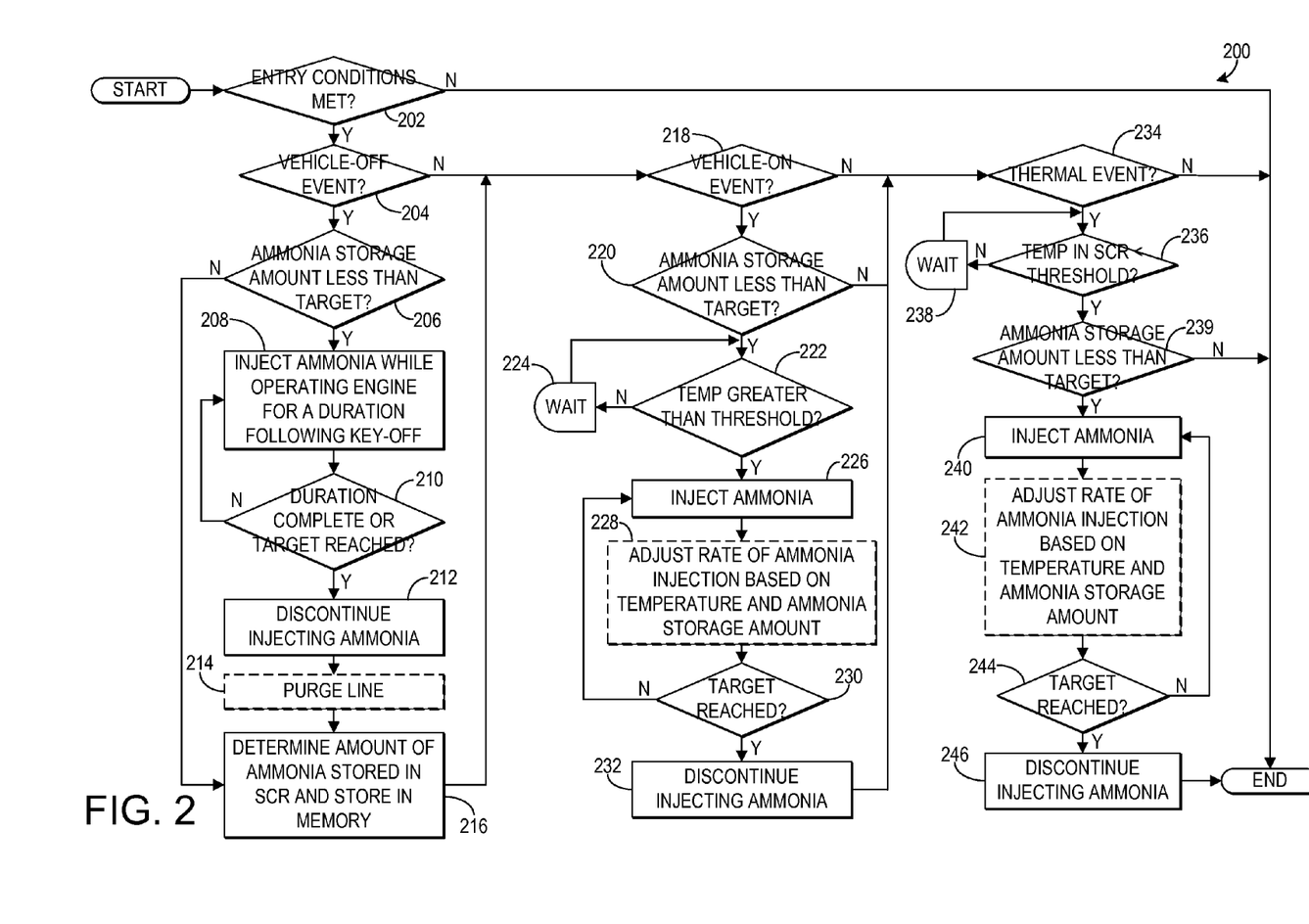
FIG. 2 shows an example method for managing ammonia storage in an SCR catalyst in accordance with the disclosure.
Figure 3:
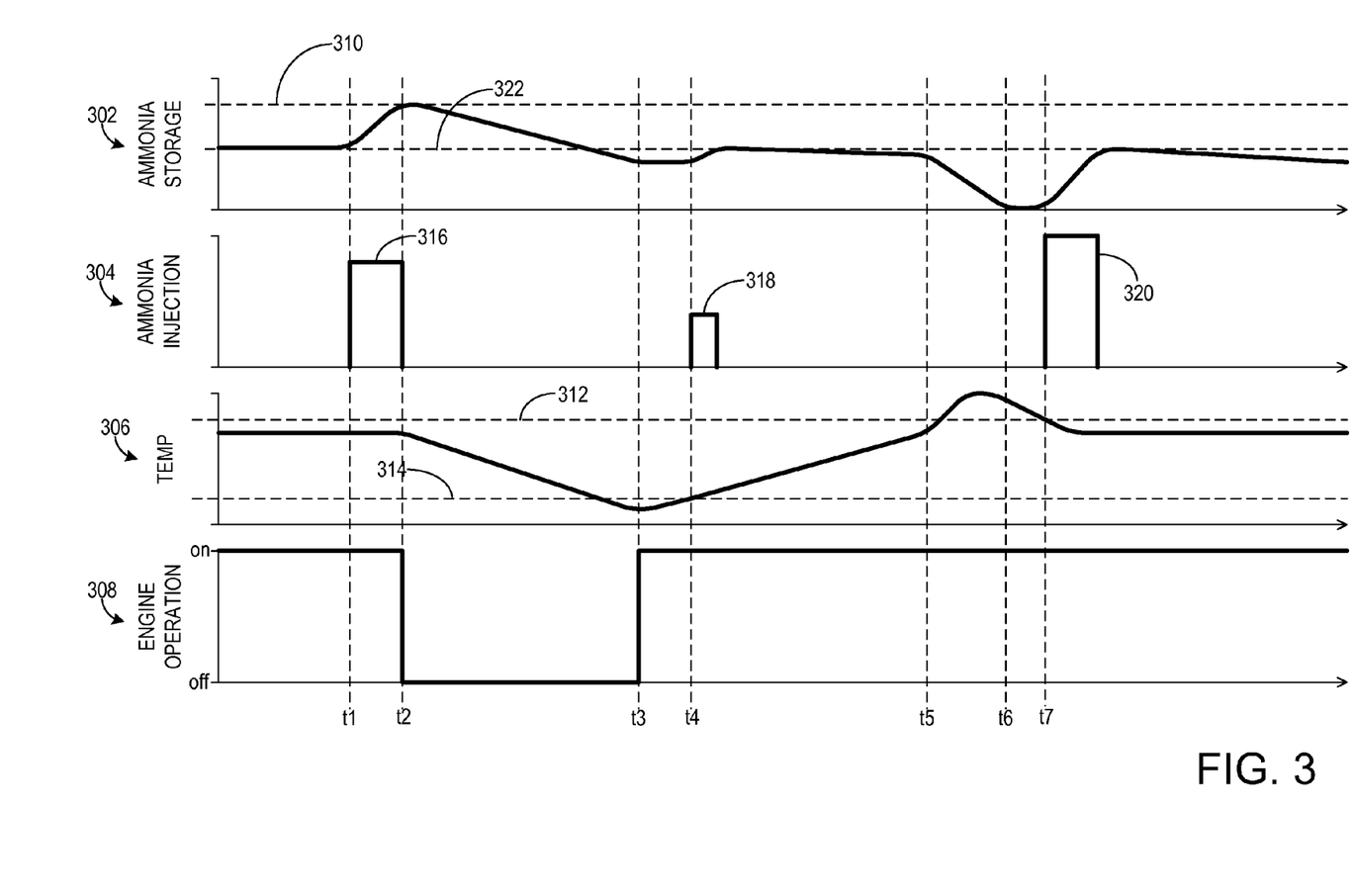
FIG. 3 illustrates an example method for managing ammonia storage in an SCR catalyst in accordance with the disclosure.

The following description relates to systems and methods for managing ammonia storage in a selective catalytic reduction (SCR) catalyst included in an emission control system of an engine, such as the engine shown in FIG. 1. As shown in FIGS. 2 and 3, an amount of ammonia stored in an SCR may be managed and replenished during various conditions in order to maintain a desired NOx conversion capability in the catalyst. For example, an additional amount of ammonia, e.g., in the form of urea or diesel exhaust fluid (DEF), may be injected following a vehicle-off event so that a sufficient amount of ammonia may remain in the SCR catalyst during a subsequent vehicle-on event after the engine cools down. Further, following a cold start event or following a thermal event, such as a diesel particulate filter (DPF) regeneration event, injection of ammonia may be adjusted to quickly replenish the SCR catalyst so that a desired NOx conversion capability of the catalyst is maintained.

Turning now to the figures, FIG. 1 shows a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in some examples, an exhaust gas recirculation (EGR) system may route a desired portion of exhaust gas from exhaust passage 48 to intake passage 44 via EGR passage 140. The amount of EGR provided to intake passage 48 may be varied by controller 12 via EGR valve 142. Further, an EGR sensor 144 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust O2 sensor and/or an intake oxygen sensor. Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger. In some examples, however, the engine system may not include an EGR system.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. However, in some example, engine 10 may not include a turbocharger but may instead be a normally aspirated engine.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control system 70 is shown arranged along exhaust passage 48 downstream of exhaust gas sensor 126. Emission control system 70 may include a selective catalytic reduction (SCR) system, a three way catalyst (TWC), $NO_x$ trap, various other emission control devices, or combinations thereof. For example, emission control system 70 may be an exhaust aftertreatment system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). The DPF may be thermally regenerated periodically during engine operation. Further, in some embodiments, during operation of engine 10, emission control system 70 may be periodically reset by operating at least one cylinder of the engine within a particular air/fuel ratio.

Engine exhaust systems may use various injections of a reductant to assist in the reaction of various exhaust emissions. For example, a reductant injection system may be provided to inject a suitable reductant, such as ammonia, to SCR catalyst 71. However, various alternative approaches may be used, such as solid urea pellets that generate an ammonia vapor, which is then injected or metered to SCR catalyst 71. In still another example, a lean NOx trap may be positioned upstream of SCR catalyst 71 to generate ammonia for the SCR catalyst, depending on the degree or richness of the air-fuel ratio fed to the Lean NOx trap. As yet another example, a lean NOx trap may be positioned upstream or downstream of SCR catalyst 71 and a urea source may be used to provide ammonia for the SCR catalyst. In still another example, a passive NOx adsorber may be may be positioned upstream or downstream of SCR catalyst 71 and a urea source may be used to provide ammonia for the SCR catalyst.

In one example, the reductant may include Diesel Exhaust Fluid (DEF), which may include a urea-based chemical reactant used in selective catalytic reduction (SCR) to reduce emissions of oxides of nitrogen in the exhaust of diesel vehicles. DEF may be stored in a storage vessel, such as a tank, on-board a vehicle. The DEF tank may be periodically refilled via a filler pipe coupled to the DEF tank so that DEF fluid may be available during engine operation.

The exhaust system may further include a reductant delivery and/or storage system, such as DEF system 121. As noted herein, the DEF may be a liquid reductant, such as a urea, stored in a storage vessel, such as a storage tank. In one example, the DEF system 121 may include DEF tank 111 for onboard DEF storage, a DEF delivery line 123 that couples the DEF tank to the exhaust via an injector at or upstream of SCR 71. The DEF tank 111 may be of various forms, and may include a fill neck 113 and corresponding cap and/or cover door in the vehicle body. Filler neck 113 may be configured to receive a nozzle for replenishing DEF.

DEF system 121 may also include a DEF injector 125 in line 123 which injects DEF into the exhaust upstream of the SCR. DEF injector 125 may be used to control the timing and amount of DEF injections, via the control system 14. DEF system 222 may further include a DEF pump 127. DEF pump 127 may be used to pressurize and deliver DEF into the line 123. DEF system 121 may further include a DEF line heater 131 which heats DEF line 123. For example, the DEF line heater may warm the DEF fluid on the way to the DEF pump at low temperatures in order to maintain a DEF fluid viscosity. The heater may be a resistive heater, or various other configurations. The heater may be coupled to a power supply 133, such as a battery system, and may be enabled and controlled via one or more switches via control system 12, for example.

Further, one or more sensors, e.g., pressure, temperature, and/or NOx sensors, may be included in the engine exhaust and/or in emission control system 70 to monitor parameters associated with devices included in the emission control system. For example, one or more sensors may be used to determine an amount of ammonia stored in SCR catalyst 71 based on a temperature of the catalyst, exhaust gas sensor readings, amount of ammonia injected into the SCR catalyst, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

FIG. 2 shows an example method 200 for managing ammonia storage in an SCR catalyst including in an emission control system in an engine. For example, method 200 may be used to maintain a desired amount of ammonia storage in an SCR catalyst included in a diesel engine such as the engine shown in FIG. 1. Ammonia may be provided to the catalyst in the form of urea or DEF in any suitable manner. For example, ammonia may be injected via an injection system in an exhaust stream upstream of the SCR catalyst for storage therein.

At 202, method 200 includes determining if entry conditions are met. Entry conditions may be based on various engine operating conditions including whether the engine is in operation and whether a source of ammonia of a sufficient amount of ammonia is available onboard the vehicle to replenish ammonia in the SCR catalyst. If entry conditions are met at 202, method 200 proceeds to 204.

At 204, method 200 includes determining if a vehicle-off event occurs. For example, the engine may be in operation and a vehicle operator may provide suitable input, e.g., actuate an off button or perform a key-off, to discontinue engine operation, e.g., via performing a key-off to shutdown the engine. If a vehicle-off event occurs, method 200 proceeds to 206.

At 206, method 200 includes determining if an ammonia storage amount is less than a target amount. For example, an amount of ammonia stored in the SCR catalyst may be determined based on one or more sensor readings and/or an amount of ammonia previously provided to the SCR catalyst together with monitoring engine operation parameters to determine the amount of ammonia currently stored in the SCR catalyst.

The target ammonia storage amount may be greater than an amount of ammonia stored in the catalyst for a desired NOx conversion capability. For example, the target amount of stored ammonia may take into account an amount of ammonia storage decrease which may occur on the next vehicle-on event, e.g., the next key-on, after the engine is shut-down due cold start conditions. Further, the target amount of stored ammonia may take into account an amount of ammonia storage decrease which may occur from a reduced amount of ammonia partial pressure due to no incoming gas or from increases in ambient temperature (e.g., diurnals) during the engine-off condition. Decreases in temperature may cause the amount of ammonia storage in the catalyst to decrease below an optimal threshold, thus this target amount of ammonia storage at vehicle-off may compensate for this decrease. In some examples, the additional amount of ammonia added to the SCR catalyst at vehicle-off may be based on a predetermined average time duration between vehicle-off events and subsequent vehicle-on events, thus may be based on a vehicle usage profile for a particular vehicle operator. For example, if the vehicle is operated with short durations between vehicle-off events and vehicle-on events then the amount of additional ammonia added to the catalyst after the vehicle-off event may be reduced compared to when the vehicle is operated with longer durations between vehicle-off events and vehicle-on events. Further, the amount of additional ammonia added to the catalyst after the vehicle-off may be based on ambient temperatures, where an increased amount of additional ammonia may be added to the catalyst during low ambient temperature conditions and a decreased amount of additional ammonia may be added during higher ambient temperature conditions.

If the ammonia storage amount in the catalyst is not less than the target amount at 206, method 200 proceeds to 216 described below. However, if the ammonia storage amount is less than the target at 206, method 200 proceeds to 208. At 208, method 200 includes injecting ammonia while operating the engine for a duration following the vehicle-off event. For example, in response to the vehicle-off event, ammonia may be injected during a final exhaust blowdown until a predetermined value of ammonia is stored in the SCR catalyst. In some examples, the final blowdown may occur in a predetermined cylinder of the engine, where the predetermined cylinder is chosen based on engine operating parameters such as a firing order of the cylinders of the engine, engine speed, engine deceleration, etc. Further, the final blowdown may be a full exhaust blowdown and not a partial blowdown, so that the engine is shut-down immediately following the final blowdown. In some examples, reversal of the engine may be performed during the final exhaust blowdown in order to assist in engine deceleration.

In some examples, the duration that the engine is operated after the vehicle-off event may be a predetermined duration and may be based on a difference between an amount of ammonia stored in the SCR catalyst and the predetermined or target value of ammonia at the vehicle-off event. For example, the duration of engine operation after the vehicle-off event may be increased if a greater amount of ammonia is to be injected to the SCR catalyst for storage therein to meet the target amount. However, in some examples, the duration of engine operation after a vehicle-off event may be subject to a time constraint so that, even if the target amount of ammonia storage is not reached while injecting ammonia during engine operation after the vehicle-off event, the engine may still shut down and ammonia injection discontinued.

At 210, method 200 includes determining if the duration is complete or if the target ammonia storage amount is reached. For example, the amount of ammonia injected to the SCR catalyst during engine operation after the vehicle-off event may be metered and monitored to determine if and when the target amount of ammonia stored in the SCR catalyst is reached. However, as remarked above, in some examples, the duration of engine operation may be subject to a time threshold so that if the time that engine is operated after the vehicle-off event reaches or exceeds the threshold then the engine is shut down and ammonia injection ceased regardless of whether the target storage amount has been reached or not.

If the duration is not complete and the target is not yet reached at 210, method 200 continues injecting ammonia at 208. In some examples, a rate of ammonia injection may be adjusted so that the target amount of ammonia stored in the SCR catalyst is reached before the predetermined duration of engine operation following the vehicle-off event has elapsed. For example, the rate of ammonia injection may be increased to reach the target storage amount during the predetermined engine operation duration following the vehicle-off event. If the duration is complete or if the target amount of stored ammonia is reached at 210, method 200 proceeds to 212. At 212, method 200 includes discontinuing injecting ammonia. Further, the engine may be shut-down in response to the vehicle-off event after the ammonia injection.

In some examples, an ammonia injection system may include an air assisted injection system which uses one or more air pumps to actively atomize urea and spray it into the exhaust stream. Such systems may perform a line purge cycle after a vehicle-off event where the air assisted injection system is operated after the vehicle-off event to clear urea lines of any liquid urea. If such a system is employed, this line purge cycle may be delayed until after the additional ammonia is injected during engine operation following the vehicle-off event. Thus, at 214, method 200 may include purging the line or operating an air assisted ammonia injection system for a duration without injecting ammonia following injection of ammonia during the final exhaust blowdown.

At 216, method 200 includes determining an amount of ammonia stored in the SCR catalyst and storing the amount in a memory component. For example, following injection of additional ammonia during the engine operation following the vehicle-off event, the amount of ammonia injected and/or the amount of ammonia stored in the SCR catalyst may be determined and stored in a memory component of a controller, e.g., controller 12, coupled to the engine so that the amount of ammonia stored in the catalyst is available for subsequent engine operation.

Returning to 204, if a vehicle-off event does not occur or following step 216, method 200 proceeds to 218. For example, after the vehicle-off event the engine may remain shut-down for a time duration during which temperatures in the SCR catalyst may decrease potentially leading to a decrease in an amount of ammonia stored therein. As described above, by injecting the additional amount of ammonia to the catalyst after the vehicle-off event then, even if the ammonia storage decreased while the engine is not in operation, a sufficient amount of ammonia may remain stored in the catalyst after a subsequent vehicle-on event following the vehicle-off event.

At 218, method 200 includes determining if a vehicle-on event occurs. For example, the vehicle-on event may be any suitable input provided by a vehicle operator to start the engine, e.g., a key-on or an actuation of an on button and may be subsequent to the vehicle-off event described above so that no other vehicle-on events occur between the vehicle-off event and the subsequent vehicle-on event. For example, the engine may be off for the entire duration between the vehicle-off event and the subsequent vehicle-on event, with no other engine starts therebetween. The vehicle-on event may be initiated by a vehicle operator to start the engine from rest, for example. If a vehicle-on event occurs at 218, method 200 proceeds to 220.

At 220, method 200 includes determining if an ammonia storage amount is less than a target ammonia storage amount. For example, prior to the vehicle-on event, temperatures in the catalyst may have decreased leading to a decrease in an amount of ammonia stored in the catalyst. In some examples, during engine-off conditions the amount of ammonia stored in the catalyst may decrease below a desired target storage amount corresponding to a desired NOx conversion capability. For example, this target amount may be a predetermined ammonia storage amount associated with optimal catalyst operation. If the ammonia storage amount is not less than the target at 220, method 200 proceeds to 234 described below. However, if the ammonia storage amount is less than the target at 220, method 200 proceeds to 222.

At 222, method 200 includes determining if a temperature is greater than a threshold. As remarked above, active ammonia injection may not be possible at cold exhaust gas temperatures following a cold start event (e.g., less than 190° C.), thus following the vehicle-on event the temperature in the catalyst or temperatures in an exhaust of the engine may be monitored to determine when ammonia may be efficiently replenished in the SCR catalyst. If the temperature is not greater than the threshold, e.g., less than the threshold, at 222, method 200 proceeds to 224 to wait until the temperature rises above the threshold. For example, operation of the engine may be continued until the threshold temperature is reached. When the temperature reaches or exceeds the threshold at 222, method 200 proceeds to 226.

At 226, method 200 includes injecting ammonia. For example, in response to the subsequent vehicle-on event when an amount of ammonia stored in the SCR catalyst is less than the predetermined value, ammonia may be injected until the predetermined value of ammonia is stored in the SCR catalyst. This amount of ammonia injected following the vehicle-on event may be based on a time duration between the vehicle-off event and the subsequent vehicle-on event since the time duration may be related to a an amount of decrease in ammonia storage while the engine was shut down between the vehicle-off event and the vehicle-on event. Further, the amount of ammonia injected may be based on a temperature of the catalyst and may be further based on engine speed and engine load.

At 228, method 200 may include adjusting a rate of ammonia injection based on temperature and/or based on an ammonia storage amount. For example, the rate of ammonia injection may be adjusted based on a temperature of the SCR catalyst and/or based on a difference between the amount of ammonia stored in the SCR catalyst and the predetermined or target value of ammonia storage in the catalyst. For example, a rate of urea or DEF injection may be increased in response to an increase in ammonia storage depletion so that the ammonia is replenished quickly in the SCR catalyst following the vehicle-on event. In particular, the DEF or urea injection may be injected above stoichiometry following the vehicle-on event in the case where the vehicle-off refill strategy did not reach the target ammonia storage.

At 230, method 200 includes determining if the target amount of ammonia storage has been reached. For example, the amount of ammonia injected to the SCR catalyst following the vehicle-on event may be metered and monitored to determine when the target amount of ammonia stored in the SCR catalyst is reached. If the target amount of ammonia storage has not been reached at 230, method 200 continues injecting ammonia at 226. However, if the target amount of ammonia storage has been reached at 230, method 200 proceeds to 232 to discontinue injecting ammonia.

Returning to 218, if a vehicle-on event does not occur or following step 232, method 200 proceeds to 234. At 234, method 200 includes determining if a thermal event occurs. As remarked above, thermal events, wherein an SCR catalyst experiences active and rapid heating such as during a DPF regeneration event, may lead to substantial depletion of ammonia storage in an SCR catalyst. As another example, a thermal event may comprise a desulfation (deSOx) event to purge a lean NOx trap and/or a passive NOx adsorber of sulfur which is done at high temperature, rich conditions that would also purge the SCR catalyst of ammonia, requiring a refill after the system cooled back down. Thus, following a thermal event, it may be desirable to replenish ammonia storage at rate faster than that provided by closed loop storage control in order to more rapidly regain optimal NOx conversion efficiency following the thermal event. Determining if a thermal event occurs may be based on temperature changes in the exhaust and/or catalyst wherein the rate of temperature change or the amount of temperature change is greater than a threshold amount. If a thermal event occurs at 234, method 200 proceeds to 236.

At 236, method 200 includes determining if a temperature in the SCR catalyst is less than a threshold. As remarked above, NOx conversion capability may increase with temperature up to some upper threshold temperature which is typically in the range of operational interest (e.g., approximately 400° C.) and reduce thereafter. During a thermal event, the temperate may increase above the threshold temperature, e.g., above approximately 400° C., so that NOx conversion capability is reduced during the thermal event. Thus, temperatures in the catalyst or exhaust may be monitored to determine when the temperature falls below this threshold temperature. If a temperature in the SCR catalyst not is less than the threshold at 236, method 200 proceeds to 238 to wait until a temperature in the SCR catalyst is less than the threshold. When the temperature in the SCR catalyst is less than the threshold at 236, method 200 proceeds to 239.

At 239, method 200 includes determining if an ammonia storage amount in the catalyst is less than a target amount. For example, the amount of ammonia stored in the SCR catalyst following the thermal event may be determined and compared to a target ammonia storage amount corresponding to a desired NOx conversion efficiency. This target amount may be based on an amount of ammonia stored in the SCR catalyst and a temperature in the SCR catalyst following the thermal event together with other engine operating conditions such as engine speed and engine load.

If the ammonia storage amount is less than the target amount at 239, method 200 proceeds to 240. At 240, method 200 includes injecting ammonia. For example, following the thermal event when a temperature of the SCR catalyst is less than an upper temperature threshold, ammonia may be injected until a target value of ammonia is stored in the SCR catalyst.

At 242, method 200 may include adjusting a rate of ammonia injection based on temperature and/or an ammonia storage amount. For example, the rate of ammonia injection may be adjusted based on a temperature of the SCR catalyst and/or based on a difference between the amount of ammonia stored in the SCR catalyst and the predetermined or target value of ammonia storage in the catalyst. For example, a rate of ammonia storage may increase in response to an increase in ammonia storage depletion so that the ammonia is replenished quickly in the SCR catalyst following the thermal event.

At 244, method 200 includes determining if the target ammonia storage amount is reached. For example, the amount of ammonia injected to the SCR catalyst following the thermal event may be metered and monitored to determine when the target amount of ammonia stored in the SCR catalyst is reached. If the target is not reached at 244, method 200 continues injecting ammonia at 240. However, if the target is reached at 244, method 200 proceeds to 246 to discontinue injecting ammonia.

FIG. 3 illustrates an example method, e.g., method 200 described above, for managing and replenishing ammonia storage in an SCR catalyst during various operating conditions. The graph 302 in FIG. 3 shows ammonia storage amount in an SCR catalyst versus time, the graph 304 shows ammonia injection versus time, the graph 306, shows SCR catalyst temperature versus time, and the graph 308 shows engine operation versus time.

At time t1 in FIG. 3, a vehicle-off event occurs. Prior to the vehicle-off event at time t1, the engine is in operation and the amount of ammonia stored in the catalyst is substantially equal to a desired amount 322 of stored ammonia in the catalyst corresponding to a desired NOx conversion efficiency. After the vehicle-off event at time t1, the engine is maintained in operation and an injection 316 of ammonia is performed so that the amount of ammonia stored in the catalyst is increased to an amount 310 greater than the desired storage amount 322. After the ammonia injection 316 increased the ammonia storage to the increased level 310 following the vehicle-off event, the engine is shut-down at time t2.

After the engine is shut down at time t2, temperatures in the SCR catalyst decrease leading to a decrease in the amount of ammonia stored in the catalyst. However, since an additional amount 310 of ammonia was stored in the catalyst following the vehicle-off event at time t1, the storage depletion at the subsequent vehicle-on event at time t3 may be reduced.

At time t3, the subsequent vehicle-on event is performed and the temperature in the catalyst begins to increase due to engine operation. However, following the vehicle-on event at time t3, which may be a cold-start, temperatures in the catalyst may be below a lower temperature threshold 314 for the catalyst so that addition of ammonia for storage in the catalyst may not be effective. However, once the temperature in the catalyst increases above the lower temperature threshold 314, ammonia may be replenished in the catalyst to achieve the target or desire amount 322 of storage in the catalyst. Thus, at time t4 an injection 318 of ammonia is performed so that ammonia storage in the catalyst increases to the desired amount 322. The amount and timing of the ammonia injection 318 may be based on a difference between the amount of ammonia stored in the catalyst and the desired storage amount 322, catalyst temperature, and engine operating conditions such as engine load and engine speed.

At time t5 during engine operation, a thermal event begins. For example, at time t5 a DPF regeneration event may be initiated to purge the DPF. During the thermal event between times t5 and t6, temperatures in the catalyst increase above an upper catalyst threshold temperature 312 resulting in a depletion in ammonia storage in the catalyst. After the thermal event ends at time t6, temperatures in the catalyst may remain above the upper threshold 312 at which NOx conversion capability is degraded. However, at time t7, temperatures in the catalyst decrease below the upper threshold 312 so that an ammonia injection 320 may be performed to replenish the ammonia storage in the catalyst following the thermal event. The amount and timing of the ammonia injection 320 may be based on a difference between the amount of ammonia stored in the catalyst and the desired storage amount 322, catalyst temperature, and engine operating conditions such as engine load and engine speed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine with an SCR catalyst, comprising:
   in response to a vehicle-off event, injecting ammonia via an injector during a final exhaust blowdown of a cylinder selected based on firing order until a predetermined value of ammonia is stored in the SCR catalyst;
   in response to a subsequent vehicle-on event where an amount of ammonia stored in the SCR catalyst is less than the predetermined value, injecting ammonia via the injector until the predetermined value of ammonia is stored in the SCR catalyst; and
   in response to a thermal event where the vehicle-on event does not occur, and when a temperature of the SCR catalyst is less than an upper temperature threshold, injecting ammonia via the injector until a target value of ammonia is stored in the SCR catalyst, wherein the target value of ammonia is based on the amount of ammonia stored in the SCR catalyst and a temperature in the SCR catalyst following the thermal event.

2. The method of claim 1, wherein injecting ammonia in response to the vehicle-on event comprises injecting ammonia in an amount based on a temperature of the SCR catalyst, wherein an engine reversal is performed during the final exhaust blowdown of the selected cylinder.

3. The method of claim 1, further comprising adjusting a rate of ammonia injection based on a difference between the amount of ammonia stored in the SCR catalyst and the predetermined value of ammonia.

4. The method of claim 1, wherein the final exhaust blowdown comprises operating the engine for a predetermined duration following the vehicle-off event.

5. The method of claim 4, wherein the predetermined duration is based on a difference between the amount of ammonia stored in the SCR catalyst and the predetermined value of ammonia at the vehicle-off event.

6. The method of claim 1, wherein the thermal event is a diesel particulate filter regeneration event or a desulfation event.

7. The method of claim 1, wherein injecting ammonia in response to the vehicle-on event comprises injecting ammonia in an amount based on a time duration between the vehicle-off event and the subsequent vehicle-on event.

8. The method of claim 1, further comprising operating an air assisted ammonia injection system for a duration without injecting ammonia following injection of ammonia during the final exhaust blowdown.

9. The method of claim 1, wherein injecting ammonia in response to the subsequent vehicle-on event is performed in response to an engine exhaust gas temperature greater than a threshold temperature.

10. The method of claim 1, wherein the ammonia comprises urea or diesel exhaust fluid.

11. The method of claim 1, further comprising determining the amount of ammonia stored in the SCR catalyst following the vehicle-off event and storing the amount of ammonia in a memory component of a controller coupled to the engine.

12. A method for a diesel engine with an SCR catalyst, comprising:
    in response to a vehicle-off event, operating the engine for a predetermined duration while injecting ammonia via an injector until a predetermined value of ammonia is stored in the SCR catalyst;
    in response to a subsequent vehicle-on event where an amount of ammonia stored in the SCR catalyst is less than the predetermined value, injecting ammonia via the injector until the predetermined value of ammonia is stored in the SCR catalyst; and
    in response to a diesel particulate filter regeneration event where the vehicle-on event does not occur, and when a temperature of the SCR catalyst is less than an upper temperature threshold, injecting ammonia until a target value of ammonia is stored in the SCR catalyst, wherein when the temperature of the SCR catalyst is not less than the upper temperature threshold, waiting to inject ammonia until the temperature condition is achieved.

13. The method of claim 12, further comprising adjusting a rate of ammonia injection based on a difference between the amount of ammonia stored in the SCR catalyst and the predetermined value of ammonia.

14. The method of claim 12, wherein the target value of ammonia is based on the amount of ammonia stored in the SCR catalyst and a temperature in the SCR catalyst following a thermal event.

15. The method of claim 12, wherein injecting ammonia in response to the vehicle-on event comprises injecting ammonia in an amount based on a time duration between the vehicle-off event and the subsequent vehicle-on event.

16. A method for a diesel engine with an SCR catalyst, comprising:
    in response to a vehicle-off event, operating the engine for a predetermined duration while injecting ammonia until a predetermined value of ammonia is stored in the SCR catalyst;
    in response to a subsequent vehicle-on event where an amount of ammonia stored in the SCR catalyst is less than the predetermined value and when a temperature of the SCR catalyst is greater than a threshold temperature, injecting ammonia until the predetermined value of ammonia is stored in the SCR catalyst, wherein when the temperature of the SCR catalyst is not greater than the threshold temperature, waiting to inject ammonia until the temperature condition is achieved; and
    in responsive to a thermal event including a diesel particulate filter regeneration event where the vehicle-on event does not occur, and when a temperature of the SCR catalyst is less than an upper temperature threshold, injecting ammonia until a target value of ammonia is stored in the SCR catalyst, wherein the target value of ammonia is based on the amount of ammonia stored in the SCR catalyst and a temperature in the SCR catalyst following the thermal event.

17. The method of claim 16, further comprising increasing a rate of ammonia injection in response to a decreasing temperature in the SCR catalyst.

* * * * *